(12) United States Patent
Brothers et al.

(10) Patent No.: US 8,785,516 B2
(45) Date of Patent: Jul. 22, 2014

(54) FLUOROPOLYMER DISPERSION TREATMENT EMPLOYING ULTRAVIOLET LIGHT AND OXYGEN SOURCE TO REDUCE FLUOROPOLYMER RESIN DISCOLORATION

(71) Applicant: E I du Pont de Nemours and Company, Wilmington, DE (US)

(72) Inventors: Paul Douglas Brothers, Chadds Ford, PA (US); Gregory Allen Chapman, Washington, WV (US); Subhash Vishnu Gangal, Hockessin, DE (US); Dipti Dilip Khasnis, Wilmington, DE (US); Adam Paul Smith, Vienna, WV (US)

(73) Assignee: E I du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 13/875,316

(22) Filed: May 2, 2013

(65) Prior Publication Data
US 2013/0303650 A1 Nov. 14, 2013

Related U.S. Application Data

(60) Provisional application No. 61/644,633, filed on May 9, 2012.

(51) Int. Cl.
| | |
|---|---|
| B29C 71/04 | (2006.01) |
| C08F 2/46 | (2006.01) |
| B01J 19/12 | (2006.01) |
| C08F 114/26 | (2006.01) |
| C08F 214/26 | (2006.01) |
| C08F 6/00 | (2006.01) |
| C08J 3/28 | (2006.01) |

(52) U.S. Cl.
CPC ............. *B01J 19/123* (2013.01); *C08F 114/26* (2013.01); *C08F 214/262* (2013.01); *C08F 6/006* (2013.01); *C08F 2800/20* (2013.01); *C08J 2327/18* (2013.01); *C08J 3/28* (2013.01)
USPC .......................................................... 522/83

(58) Field of Classification Search
CPC ............ B29C 71/04; B29C 2035/0877; B29C 65/1425; B29C 65/36; B29C 66/90; B29C 59/16; C09D 175/16; C08F 10/00; C08F 2312/06; D06N 3/047; H05K 2201/015
USPC ...................................... 522/83, 71, 189, 184
See application file for complete search history.

(56) References Cited

U.S. PATENT DOCUMENTS

| | | | |
|---|---|---|---|
| 2,784,170 A | 3/1957 | Walter et al. | |
| 3,282,875 A | 11/1966 | Connolly et al. | |
| 3,391,099 A | 7/1968 | Punderson | |
| 3,700,627 A | 10/1972 | Miller | |
| 4,036,802 A | 7/1977 | Poirier | |
| 4,358,545 A | 11/1982 | Ezzell et al. | |
| 4,552,631 A | 11/1985 | Bissot et al. | |
| 4,626,587 A | 12/1986 | Morgan et al. | |
| 4,675,380 A | 6/1987 | Buckmaster et al. | |
| 4,743,658 A | 5/1988 | Imbalzano et al. | |
| 4,940,525 A | 7/1990 | Ezzell et al. | |
| 5,180,803 A | 1/1993 | Gibbard | |
| 5,391,709 A | 2/1995 | Egres, Jr. et al. | |
| 5,491,214 A | 2/1996 | Daughenbaugh et al. | |
| 5,637,748 A | 6/1997 | Hung et al. | |
| 5,703,185 A | 12/1997 | Blair | |
| 5,859,086 A * | 1/1999 | Freund et al. | ............... 522/83 |
| 6,177,196 B1 | 1/2001 | Brothers et al. | |
| 6,300,445 B1 | 10/2001 | Hung et al. | |
| 6,664,337 B2 | 12/2003 | Hiraga et al. | |
| 6,689,833 B1 | 2/2004 | Bidstrup et al. | |
| 6,794,487 B2 | 9/2004 | Hiraga et al. | |
| 6,838,545 B2 | 1/2005 | Chapman et al. | |
| 7,763,680 B2 | 7/2010 | Aten et al. | |
| 2004/0084296 A1 | 5/2004 | Hori et al. | |
| 2007/0129500 A1 | 6/2007 | Honda et al. | |
| 2009/0221776 A1* | 9/2009 | Durali et al. | .............. 526/249 |
| 2010/0204345 A1 | 8/2010 | Yamanaka et al. | |

FOREIGN PATENT DOCUMENTS

| | | |
|---|---|---|
| EP | 0469759 A1 | 7/1991 |
| EP | 1170303 A1 | 11/1999 |
| EP | 1043353 A1 | 10/2000 |
| EP | 1054023 A1 | 11/2000 |
| EP | 0928673 B1 | 11/2002 |
| EP | 1380605 A1 | 1/2004 |
| FR | 1140964 | 8/1957 |
| FR | 1143777 A | 10/1957 |
| GB | 1210794 | 10/1970 |

(Continued)

OTHER PUBLICATIONS

Tsuda, Nobuhiko et al; "Method for Producing Fluorine-Containing Polymer Compositions With Good Coloring Resistance During Processing", XP002702454, Database CA [Online] Chemical Abstracts Service, Columbus, Ohio, US; May 5, 2005.
Sagisaka, Shigehito et al: Method for Producing Purified Fluorine-Containing Polymer:, XP002712775, Database CA [Online] Chemical Abstracts Service, Columbus, Ohio, US; Jan. 30, 2009.
Hollender, C., Authorized Officer, PCT, International Search Report, PCT/US2013/039357, Sep. 9, 2013.
Hollender, C., Authorized Officer, PCT, International Search Report, PCT/US2013/039358, Sep. 4, 2013.
Hollender, C., Authorized Officer, PCT, International Search Report, PCT/US2013/039360, Jul. 19, 2013.

(Continued)

*Primary Examiner* — Ling Choi
*Assistant Examiner* — Jessica E Whiteley

(57) ABSTRACT

Process for reducing thermally induced discoloration of fluoropolymer resin produced by polymerizing fluoromonomer in an aqueous dispersion medium to form aqueous fluoropolymer dispersion and isolating said fluoropolymer from said aqueous medium to obtain said fluoropolymer resin. The process comprises exposing the aqueous fluoropolymer dispersion to ultraviolet light in the presence of an oxygen source.

11 Claims, No Drawings

(56) References Cited

FOREIGN PATENT DOCUMENTS

| | | |
|---|---|---|
| GB | 1299520 | 12/1972 |
| JP | S45 38906 B1 | 12/1970 |
| JP | H11-100543 | 4/1999 |
| JP | 2003082020 A | 3/2003 |
| WO | 2005033150 A1 | 4/2005 |
| WO | 2009014138 A1 | 1/2009 |

OTHER PUBLICATIONS

Hollender, C., Authorized Officer, PCT, International Search Report, PCT/US2013/039363, Jul. 25, 2013.
Hollender, C., Authorized Officer, PCT, International Search Report, PCT/US2013/039365, Jul. 19, 2013.
Hollender, C., Authorized Officer, PCT, International Search Report, PCT/US2013/039367, Sep. 6, 2013.
Hollender, C., Authorized Officer, PCT, International Search Report, PCT/US2013/039369, Oct. 2, 2013.
Hollender, C., Authorized Officer, PCT, International Search Report, PCT/US2013/039374, Jul. 24, 2013.
Hollender, C., Authorized Officer, PCT, International Search Report, PCT/US2013/039394, Sep. 5, 2013.
Hollender, C. Authorized Officer, PCT, International Search Report, PCT/US2013/039400, Oct. 1, 2013.
Gometani, Jo, et al, "Modified Poly(Chlorotrifluoroethylene) and Chlorotrifluoroethylene Copolymer", May 12, 1984. Chemical Abstracts Service, Columbus, OH.
Hollender, C. Authorized Officer, PCT, International Search Report, PCT/US2013/039402, Oct. 9, 2013.

\* cited by examiner

FLUOROPOLYMER DISPERSION TREATMENT EMPLOYING ULTRAVIOLET LIGHT AND OXYGEN SOURCE TO REDUCE FLUOROPOLYMER RESIN DISCOLORATION

FIELD OF THE INVENTION

This invention relates to a process for reducing thermally induced discoloration of fluoropolymer resin.

BACKGROUND OF THE INVENTION

A typical process for the aqueous dispersion polymerization of fluorinated monomer to produce fluoropolymer includes feeding fluorinated monomer to a heated reactor containing an aqueous medium and adding a free-radical initiator to commence polymerization. A fluorosurfactant is typically employed to stabilize the fluoropolymer particles formed. After several hours, the feeds are stopped, the reactor is vented and purged with nitrogen, and the raw dispersion in the vessel is transferred to a cooling vessel.

The fluoropolymer formed can be isolated from the dispersion to obtain fluoropolymer resin. For example, polytetrafluoroethylene (PTFE) resin referred to as PTFE fine powder is produced by isolating PTFE resin from PTFE dispersion by coagulating the dispersion to separate PTFE from the aqueous medium and then drying. Dispersions of melt-processible fluoropolymers such as copolymers of tetrafluoroethylene and hexafluoropropylene (FEP) and tetrafluoroethylene and perfluoro (alkyl vinyl ethers) (PFA) useful as molding resins can be similarly coagulated and the coagulated polymer is dried and then used directly in melt-processing operations or melt-processed into a convenient form such as chip or pellet for use in subsequent melt-processing operations.

Because of environmental concerns relating to fluorosurfactants, there is interest in using hydrocarbon surfactants in the aqueous polymerization medium in place of a portion of or all of the fluorosurfactant. However, when fluoropolymer dispersion is formed which contains hydrocarbon surfactant and is subsequently isolated to obtain fluoropolymer resin, the fluoropolymer resin is prone to thermally induced discoloration. By thermally induced discoloration is meant that undesirable color forms or increases in the fluoropolymer resin upon heating. It is usually desirable for fluoropolymer resin to be clear or white in color and, in resin prone to thermally induced discoloration, a gray or brown color, sometimes quite dark forms upon heating. For example, if PTFE fine power produced from dispersion containing the hydrocarbon surfactant sodium dodecyl sulfate (SDS) is converted into paste-extruded shapes or films and subsequently sintered, an undesirable gray or brown color will typically arise. Color formation upon sintering in PTFE produced from dispersion containing the hydrocarbon surfactant SDS has been described in Example VI of U.S. Pat. No. 3,391,099 to Punderson. Similarly, when melt processible fluoropolymers such as FEP or PFA are produced from dispersions containing hydrocarbon surfactant such as SDS, undesirable color typically occurs when the fluoropolymer is first melt-processed, for example, when melt processed into a convenient form for subsequent use such as chip or pellet.

SUMMARY OF THE INVENTION

The invention provides a process for reducing thermally induced discoloration of fluoropolymer resin which was produced by polymerizing fluoromonomer in an aqueous dispersion medium to form aqueous fluoropolymer dispersion and isolating the fluoropolymer from said aqueous medium to obtain said fluoropolymer resin. It has been discovered that thermally induced discoloration of fluoropolymer resin can be reduced by:

exposing the aqueous fluoropolymer dispersion to ultraviolet light in the presence of an oxygen source.

Preferably, the process reduces the thermally induced discoloration by at least about 10% as measured by % change in L* on the CIELAB color scale.

The process of the invention is useful for fluoropolymer resin which exhibits thermally induced discoloration which ranges from mild to severe. The process of the invention may be employed for fluoropolymer resin which exhibits thermally induced discoloration prior to treatment which is significantly greater than equivalent fluoropolymer resin of commercial quality manufactured using ammonium perfluorooctanoate fluorosurfactant. The process of the invention is advantageously employed when the fluoropolymer resin has an initial thermally induced discoloration value ($L^*_i$) at least about 4 L units on the CIELAB color scale below the L* value of equivalent fluoropolymer resin of commercial quality manufactured using ammonium perfluorooctanoate fluorosurfactant.

The invention is particularly useful for fluoropolymer resin obtained from aqueous fluoropolymer dispersion made by polymerizing fluoromonomer containing hydrocarbon surfactant which causes thermally induced discoloration, preferably aqueous fluoropolymer dispersion polymerized in the presence of hydrocarbon surfactant.

DETAILED DESCRIPTION OF THE INVENTION

Fluoromonomer/Fluoropolymer

Fluoropolymer resins are produced by polymerizing fluoromonomer in an aqueous medium to form aqueous fluoropolymer dispersion. The fluoropolymer is made from at least one fluorinated monomer (fluoromonomer), i.e., wherein at least one of the monomers contains fluorine, preferably an olefinic monomer with at least one fluorine or a fluoroalkyl group attached to a doubly-bonded carbon. The fluorinated monomer and the fluoropolymer obtained therefrom each preferably contain at least 35 wt % F, preferably at least 50 wt % F and the fluorinated monomer is preferably independently selected from the group consisting of tetrafluoroethylene (TFE), hexafluoropropylene (HFP), chlorotrifluoroethylene (CTFE), trifluoroethylene, hexafluoroisobutylene, perfluoroalkyl ethylene, fluorovinyl ethers, vinyl fluoride (VF), vinylidene fluoride (VF2), perfluoro-2,2-dimethyl-1,3-dioxole (PDD), perfluoro-2-methylene-4-methyl-1,3-dioxolane (PMD), perfluoro(allyl vinyl ether) and perfluoro(butenyl vinyl ether) and mixtures thereof. A preferred perfluoroalkyl ethylene monomer is perfluorobutyl ethylene (PFBE). Preferred fluorovinyl ethers include perfluoro(alkyl vinyl ether) monomers (PAVE) such as perfluoro (propyl vinyl ether) (PPVE), perfluoro(ethyl vinyl ether) (PEVE), and perfluoro(methyl vinyl ether) (PMVE). Non-fluorinated olefinic comonomers such as ethylene and propylene can be copolymerized with fluorinated monomers.

Fluorovinyl ethers also include those useful for introducing functionality into fluoropolymers. These include $CF_2=CF-(O-CF_2CFR_f)_a-O-CF_2CFR'_fSO_2F$, wherein $R_f$ and $R'_f$ are independently selected from F, Cl or a perfluorinated alkyl group having 1 to 10 carbon atoms, a=0, 1 or 2. Polymers of this type are disclosed in U.S. Pat. No. 3,282,875

($CF_2$=CF—O—$CF_2$CF($CF_3$)—O—$CF_2CF_2SO_2F$, perfluoro(3,6-dioxa-4-methyl-7-octenesulfonyl fluoride)), and in U.S. Pat. Nos. 4,358,545 and 4,940,525 ($CF_2$=CF—O—$CF_2CF_2SO_2F$). Another example is $CF_2$=CF—O—$CF_2$CF($CF_3$)—O—$CF_2CF_2CO_2CH_3$, methyl ester of perfluoro (4,7-dioxa-5-methyl-8-nonenecarboxylic acid), disclosed in U.S. Pat. No. 4,552,631. Similar fluorovinyl ethers with functionality of nitrile, cyanate, carbamate, and phosphonic acid are disclosed in U.S. Pat. Nos. 5,637,748; 6,300,445; and 6,177,196.

A preferred class of fluoropolymers useful for reducing thermally induced discoloration is perfluoropolymers in which the monovalent substituents on the carbon atoms forming the chain or backbone of the polymer are all fluorine atoms, with the possible exception of comonomer, end groups, or pendant group structure. Preferably the comonomer, end group, or pendant group structure will impart no more than 2 wt % C—H moiety, more preferably no greater than 1 wt % C—H moiety, with respect to the total weight of the perfluoropolymer. Preferably, the hydrogen content, if any, of the perfluoropolymer is no greater than 0.2 wt %, based on the total weight of the perfluoropolymer.

The invention is useful for reducing thermally induced discoloration of fluoropolymers of polytetrafluoroethylene (PTFE) including modified PTFE. Polytetrafluoroethylene (PTFE) refers to (a) the polymerized tetrafluoroethylene by itself without any significant comonomer present, i.e. homopolymer and (b) modified PTFE, which is a copolymer of TFE having such small concentrations of comonomer that the melting point of the resultant polymer is not substantially reduced below that of PTFE. The modified PTFE contains a small amount of comonomer modifier which reduces crystallinity to improve film forming capability during baking (fusing). Examples of such monomers include perfluoroolefin, notably hexafluoropropylene (HFP) or perfluoro(alkyl vinyl ether) (PAVE), where the alkyl group contains 1 to 5 carbon atoms, with perfluoro(ethyl vinyl ether) (PEVE) and perfluoro(propyl vinyl ether) (PPVE) being preferred, chlorotrifluoroethylene (CTFE), perfluorobutyl ethylene (PFBE), or other monomer that introduces bulky side groups into the polymer molecule. The concentration of such comonomer is preferably less than 1 wt %, more preferably less than 0.5 wt %, based on the total weight of the TFE and comonomer present in the PTFE. A minimum amount of at least about 0.05 wt % is preferably used to have significant effect. PTFE (and modified PTFE) typically have a melt creep viscosity of at least about $1 \times 10^6$ Pa·s and preferably at least $1 \times 10^8$ Pa·s and, with such high melt viscosity, the polymer does not flow in the molten state and therefore is not a melt-processable polymer. The measurement of melt creep viscosity is disclosed in col. 4 of U.S. Pat. No. 7,763,680. The high melt viscosity of PTFE arises from is extremely high molecular weight (Mn), e.g. at least $10^6$. PTFE can also be characterized by its high melting temperature, of at least 330° C., upon first heating. The non-melt flowability of the PTFE, arising from its extremely high melt viscosity, results in a no melt flow condition when melt flow rate (MFR) is measured in accordance with ASTM D 1238 at 372° C. and using a 5 kg weight, i.e., MFR is 0. The high molecular weight of PTFE is characterized by measuring its standard specific gravity (SSG). The SSG measurement procedure (ASTM D 4894, also described in U.S. Pat. No. 4,036,802) includes sintering of the SSG sample free standing (without containment) above its melting temperature without change in dimension of the SSG sample. The SSG sample does not flow during the sintering.

The process of the present invention is also useful in reducing thermally induced discoloration of low molecular weight PTFE, which is commonly known as PTFE micropowder, so as to distinguish from the PTFE described above. The molecular weight of PTFE micropowder is low relative to PTFE, i.e. the molecular weight (Mn) is generally in the range of $10^4$ to $10^5$. The result of this lower molecular weight of PTFE micropowder is that it has fluidity in the molten state, in contrast to PTFE which is not melt flowable. PTFE micropowder has melt flowability, which can be characterized by a melt flow rate (MFR) of at least 0.01 g/10 min, preferably at least 0.1 g/10 min and more preferably at least 5 g/10 min, and still more preferably at least 10 g/10 min., as measured in accordance with ASTM D 1238, at 372° C. using a 5 kg weight on the molten polymer.

The invention is especially useful for reducing thermally induced discoloration of melt-processible fluoropolymers that are also melt-fabricable. Melt-processible means that the fluoropolymer can be processed in the molten state, i.e., fabricated from the melt using conventional processing equipment such as extruders and injection molding machines, into shaped articles such as films, fibers, and tubes. Melt-fabricable means that the resultant fabricated articles exhibit sufficient strength and toughness to be useful for their intended purpose. This sufficient strength may be characterized by the fluoropolymer by itself exhibiting an MIT Flex Life of at least 1000 cycles, preferably at least 2000 cycles, measured as disclosed in U.S. Pat. No. 5,703,185. The strength of the fluoropolymer is indicated by it not being brittle.

Examples of such melt-processible fluoropolymers include homopolymers such as polychlorotrifluoroethylene and polyvinylidene fluoride (PVDF) or copolymers of tetrafluoroethylene (TFE) and at least one fluorinated copolymerizable monomer (comonomer) present in the polymer usually in sufficient amount to reduce the melting point of the copolymer substantially below that of PTFE, e.g., to a melting temperature no greater than 315° C.

A melt-processible TFE copolymer typically incorporates an amount of comonomer into the copolymer in order to provide a copolymer which has a melt flow rate (MFR) of 0.1 to 200 g/10 min as measured according to ASTM D-1238 using a 5 kg weight on the molten polymer and the melt temperature which is standard for the specific copolymer. MFR will preferably range from 1 to 100 g/10 min, most preferably about 1 to about 50 g/10 min. Additional melt-processible fluoropolymers are the copolymers of ethylene (E) or propylene (P) with TFE or CTFE, notably ETFE and ECTFE.

A preferred melt-processible copolymer for use in the practice of the present invention comprises at least 40-99 mol % tetrafluoroethylene units and 1-60 mol % of at least one other monomer. Additional melt-processible copolymers are those containing 60-99 mol % PTFE units and 1-40 mol % of at least one other monomer. Preferred comonomers with TFE to form perfluoropolymers are perfluoromonomers, preferably perfluoroolefin having 3 to 8 carbon atoms, such as hexafluoropropylene (HFP), and/or perfluoro(alkyl vinyl ether) (PAVE) in which the linear or branched alkyl group contains 1 to 5 carbon atoms. Preferred PAVE monomers are those in which the alkyl group contains 1, 2, 3 or 4 carbon atoms, and the copolymer can be made using several PAVE monomers. Preferred TFE copolymers include FEP (TFE/HFP copolymer), PFA (TFE/PAVE copolymer), TFE/HFP/PAVE wherein PAVE is PEVE and/or PPVE, MFA (TFE/PMVE/PAVE wherein the alkyl group of PAVE has at least two carbon atoms) and THV (TFE/HFP/$VF_2$).

All these melt-processable fluoropolymers can be characterized by MFR as recited above for the melt-processible TFE copolymers, i.e. by the procedure of ASTM 1238 using standard conditions for the particular polymer, including a 5 kg weight on the molten polymer in the plastometer for the MFR determination of PFA and FEP Further useful polymers are film forming polymers of polyvinylidene fluoride (PVDF) and copolymers of vinylidene fluoride as well as polyvinyl fluoride (PVF) and copolymers of vinyl fluoride.

The invention is also useful when reducing thermally induced discoloration of fluorocarbon elastomers (fluoroelastomers). These elastomers typically have a glass transition temperature below 25° C. and exhibit little or no crystallinity at room temperature and little or no melting temperature. Fluoroelastomer made by the process of this invention typically are copolymers containing 25 to 75 wt %, based on total weight of the fluoroelastomer, of copolymerized units of a first fluorinated monomer which may be vinylidene fluoride ($VF_2$) or tetrafluoroethylene (TFE). The remaining units in the fluoroelastomers are comprised of one or more additional copolymerized monomers, different from the first monomer, selected from the group consisting of fluorinated monomers, hydrocarbon olefins and mixtures thereof. Fluoroelastomers may also, optionally, comprise units of one or more cure site monomers. When present, copolymerized cure site monomers are typically at a level of 0.05 to 7 wt %, based on total weight of fluorocarbon elastomer. Examples of suitable cure site monomers include: i) bromine-, iodine-, or chlorine-containing fluorinated olefins or fluorinated vinyl ethers; ii) nitrile group-containing fluorinated olefins or fluorinated vinyl ethers; iii) perfluoro(2-phenoxypropyl vinyl ether); and iv) non-conjugated dienes.

Preferred TFE based fluoroelastomer copolymers include TFE/PMVE, TFE/PMVE/E, TFE/P and TFE/P/$VF_2$. Preferred $VF_2$ based fluorocarbon elastomer copolymers include $VF_2$/HFP, $VF_2$/HFP/TFE, and $VF_2$/PMVE/TFE. Any of these elastomer copolymers may further comprise units of cure site monomer.

Hydrocarbon Surfactants

In one embodiment of the present invention, the aqueous fluoropolymer dispersion medium used to form fluoropolymer resin contains hydrocarbon surfactant which causes thermally induced discoloration in the resin when the fluoropolymer resin is isolated and heated. The hydrocarbon surfactant is a compound that has hydrophobic and hydrophilic moieties, which enables it to disperse and stabilize hydrophobic fluoropolymer particles in an aqueous medium. The hydrocarbon surfactant is preferably an anionic surfactant. An anionic surfactant has a negatively charged hydrophilic portion such as a carboxylate, sulfonate, or sulfate salt and a long chain hydrocarbon portion, such as alkyl as the hydrophobic portion. Hydrocarbon surfactants often serve to stabilize polymer particles by coating the particles with the hydrophobic portion of the surfactant oriented towards the particle and the hydrophilic portion of the surfactant in the water phase. The anionic surfactant adds to this stabilization because it is charged and provides repulsion of the electrical charges between polymer particles. Surfactants typically reduce surface tension of the aqueous medium containing the surfactant significantly.

One example anionic hydrocarbon surfactant is the highly branched C10 tertiary carboxylic acid supplied as Versatic® 10 by Resolution Performance Products.

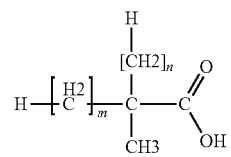

Versatic® 10
Neodecanoic acid
(n + m = 7)

Another useful anionic hydrocarbon surfactant is the sodium linear alkyl polyether sulfonates supplied as the Avanel® S series by BASF. The ethylene oxide chain provides nonionic characteristics to the surfactant and the sulfonate groups provide certain anionic characteristics.

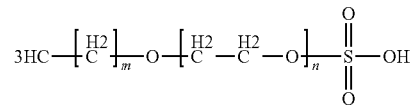

Avanel®
S-70 (n = 7, m = 11 - 14)
S-74 (n = 3, m = 8)

Another group of hydrocarbon surfactants are those anionic surfactants represented by the formula R-L-M wherein R is preferably a straight chain alkyl group containing from 6 to 17 carbon atoms, L is selected from the group consisting of —$ArSO_3^-$, —$SO_3^-$, —$SO_4^-$, —$PO_3^-$, —$PO_4^-$ and —$COO^-$, and M is a univalent cation, preferably $H^+$, $Na^+$, $K^+$ and $NH_4^+$. —$ArSO_3^-$ is aryl sulfonate. Preferred of these surfactants are those represented by the formula $CH_3$—$(CH_2)_n$-L-M, wherein n is an integer of 6 to 17 and L is selected from —$SO_4M$, —$PO_3M$, —$PO_4M$, or —COOM and L and M have the same meaning as above. Especially preferred are R-L-M surfactants wherein the R group is an alkyl group having 12 to 16 carbon atoms and wherein L is sulfate, and mixtures thereof. Especially preferred of the R-L-M surfactants is sodium dodecyl sulfate (SDS). For commercial use, SDS (sometimes referred to as sodium lauryl sulfate or SLS), is typically obtained from coconut oil or palm kernel oil feedstocks, and contains predominately sodium dodecyl sulfate but may contain minor quantities of other R-L-M surfactants with differing R groups. "SDS" as used in this application means sodium dodecyl sulfate or surfactant mixtures which are predominantly sodium docecyl sulphate containing minor quantities of other R-L-M surfactants with differing R groups.

Another example of anionic hydrocarbon surfactant useful in the present invention is the sulfosuccinate surfactant Lankropol® K8300 available from Akzo Nobel Surface Chemistry LLC. The surfactant is reported to be the following:

Butanedioic acid, sulfo-, 4-(1-methyl-2-((1-oxo-9-octadecenyl)amino)ethyl) ester, disodium salt; CAS No. 67815-88-7

Additional sulfosuccinate hydrocarbon surfactants useful in the present invention are diisodecyl sulfosuccinate, Na salt, available as Emulsogen® SB10 from Clariant, and diisotridecyl sulfosuccinate, Na salt, available as Polirol® TR/LNA from Cesapinia Chemicals.

Another preferred class of hydrocarbon surfactants is nonionic surfactants. A nonionic surfactant does not contain a charged group but has a hydrophobic portion that is typically a long chain hydrocarbon. The hydrophilic portion of the nonionic surfactant typically contains water soluble functionality such as a chain of ethylene ether derived from polymerization with ethylene oxide. In the stabilization context, surfactants stabilize polymer particles by coating the particles with the hydrophobic portion of the surfactant oriented towards the particle and the hydrophilic portion of the surfactant in the water phase.

Nonionic hydrocarbon surfactants include polyoxyethylene alkyl ethers, polyoxyethylene alkyl phenyl ethers, polyoxyethylene alkyl esters, sorbitan alkyl esters, polyoxyethylene sorbitan alkyl esters, glycerol esters, their derivatives and the like. More specifically examples of polyoxyethylene alkyl ethers are polyoxyethylene lauryl ether, polyoxyethylene cetyl ether, polyoxyethylene stearyl ether, polyoxyethylene oleyl ether, polyoxyethylene behenyl ether and the like; examples of polyoxyethylene alkyl phenyl ethers are polyoxyethylene nonyl phenyl ether, polyoxyethylene octyl phenyl ether and the like; examples of polyoxyethylene alkyl esters are polyethylene glycol monolaurylate, polyethylene glycol monooleate, polyethylene glycol monostearate and the like; examples of sorbitan alkyl esters are polyoxyethylene sorbitan monolaurylate, polyoxyethylene sorbitan monopalmitate, polyoxyethylene sorbitan monostearate, polyoxyethylene sorbitan monooleate and the like; examples of polyoxyethylene sorbitan alkyl esters are polyoxyethylene sorbitan monolaurylate, polyoxyethylene sorbitan monopalmitate, polyoxyethylene sorbitan monostearate and the like; and examples of glycerol esters are glycerol monomyristate, glycerol monostearate, glycerol monooleate and the like. Also examples of their derivatives are polyoxyethylene alkyl amine, polyoxyethylene alkyl phenyl-formaldehyde condensate, polyoxyethylene alkyl ether phosphate and the like. Particularly preferable are polyoxyethylene alkyl ethers and polyoxyethylene alkyl esters. Examples of such ethers and esters are those that have an HLB value of 10 to 18. More particularly there are polyoxyethylene lauryl ether (EO: 5 to 20. EO stands for an ethylene oxide unit), polyethylene glycol monostearate (EO: 10 to 55) and polyethylene glycol monooleate (EO: 6 to 10).

Suitable nonionic hydrocarbon surfactants include octyl phenol ethoxylates such as the Triton® X series supplied by Dow Chemical Company:

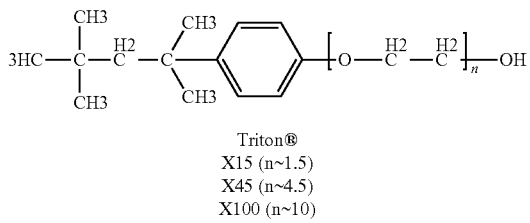

Triton®
X15 (n~1.5)
X45 (n~4.5)
X100 (n~10)

Preferred nonionic hydrocarbon surfactants are branched alcohol ethoxylates such as the Tergitol® 15-S series supplied by Dow Chemical Company and branched secondary alcohol ethoxylates such as the Tergitol® TMN series also supplied by Dow Chemical Company:

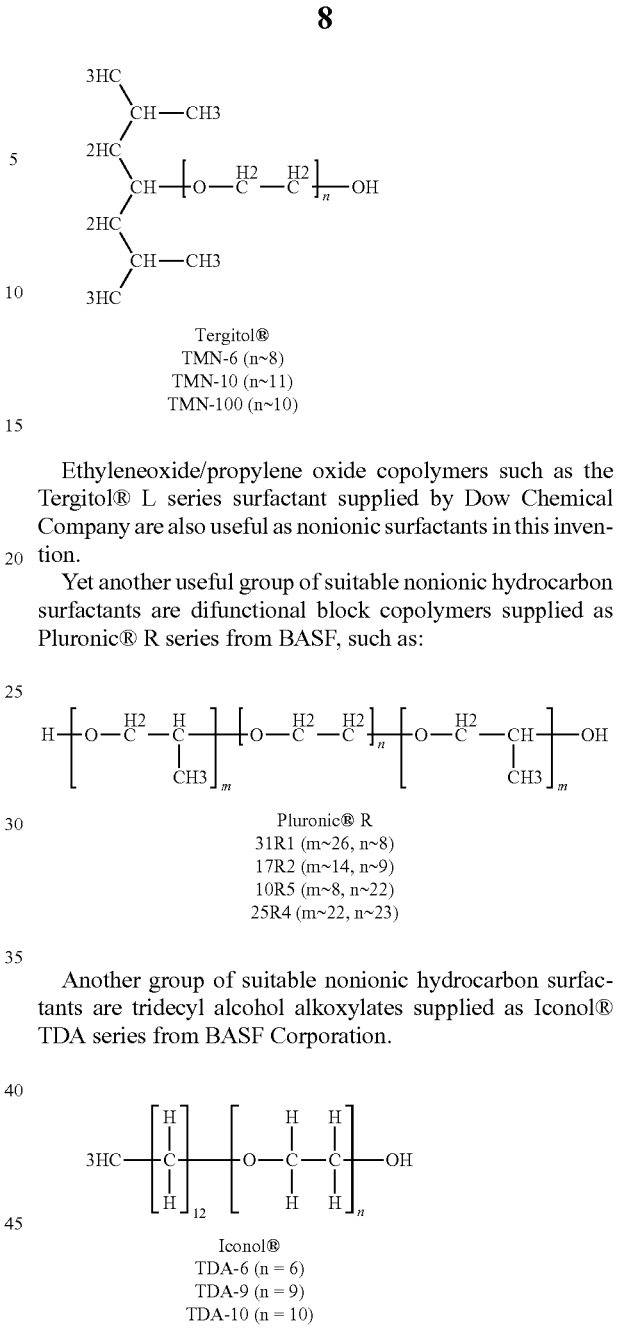

Tergitol®
TMN-6 (n~8)
TMN-10 (n~11)
TMN-100 (n~10)

Ethyleneoxide/propylene oxide copolymers such as the Tergitol® L series surfactant supplied by Dow Chemical Company are also useful as nonionic surfactants in this invention.

Yet another useful group of suitable nonionic hydrocarbon surfactants are difunctional block copolymers supplied as Pluronic® R series from BASF, such as:

Pluronic® R
31R1 (m~26, n~8)
17R2 (m~14, n~9)
10R5 (m~8, n~22)
25R4 (m~22, n~23)

Another group of suitable nonionic hydrocarbon surfactants are tridecyl alcohol alkoxylates supplied as Iconol® TDA series from BASF Corporation.

Iconol®
TDA-6 (n = 6)
TDA-9 (n = 9)
TDA-10 (n = 10)

In a preferred embodiment, all of the monovalent substituents on the carbon atoms of the hydrocarbon surfactants are hydrogen. The hydrocarbon is surfactant is preferably essentially free of halogen substituents, such as fluorine or chlorine. Accordingly, the monovalent substituents, as elements from the Periodic Table, on the carbon atoms of the surfactant are at least 75%, preferably at least 85%, and more preferably at least 95% hydrogen. Most preferably, 100% of the monovalent substituents as elements of the Periodic Table, on the carbon atoms are hydrogen. However, in one embodiment, a number of carbon atoms can contain halogen atoms in a minor amount.

Examples of hydrocarbon-containing surfactants useful in the present invention in which only a minor number of monovalent substituents on carbon atoms are fluorine instead of hydrogen are the PolyFox® surfactants available from Omnova Solutions, Inc., described below

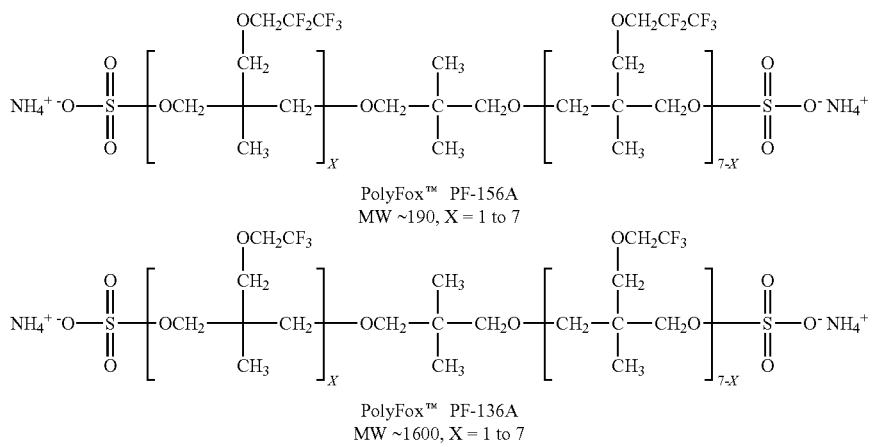

PolyFox™ PF-156A
MW ~190, X = 1 to 7

PolyFox™ PF-136A
MW ~1600, X = 1 to 7

Polymerization Process

For the practice of the present invention, fluoropolymer resin is produced by polymerizing fluoromonomer. Polymerization may be suitably carried out in a pressurized polymerization reactor which produces aqueous fluoropolymer dispersion. A batch or continuous process may be used although batch processes are more common for commercial production. The reactor is preferably equipped with a stirrer for the aqueous medium and a jacket surrounding the reactor so that the reaction temperature may be conveniently controlled by circulation of a controlled temperature heat exchange medium. The aqueous medium is preferably deionized and deaerated water. The temperature of the reactor and thus of the aqueous medium will preferably be from about 25 to about 120° C.

To carry out polymerization, the reactor is typically pressured up with fluoromonomer to increase the reactor internal pressure to operating pressure which is generally in the range of about 30 to about 1000 psig (0.3 to 7.0 MPa). An aqueous solution of free-radical polymerization initiator can then be pumped into the reactor in sufficient amount to cause kicking off of the polymerization reaction, i.e. commencement of the polymerization reaction. The polymerization initiator employed is preferably a water-soluble free-radical polymerization initiator. For polymerization of TFE to PTFE, preferred initiator is organic peracid such as disuccinic acid peroxide (DSP), which requires a large amount to cause kickoff, e.g. at least about 200 ppm, together with a highly active initiator, such as inorganic persulfate salt such as ammonium persulfate in a smaller amount. For TFE copolymers such as FEP and PFA, inorganic persulfate salt such as ammonium persulfate is generally used. The initiator added to cause kickoff can be supplemented by pumping additional initiator solution into the reactor as the polymerization reaction proceeds.

For the production of modified PTFE and TFE copolymers, relatively inactive fluoromonomer such as hexafluoropropylene (HFP) can already be present in the reactor prior to pressuring up with the more active TFE fluoromonomer. After kickoff, TFE is typically fed into the reactor to maintain the internal pressure of the reactor at the operating pressure. Additional comonomer such as HFP or perfluoro (alkyl vinyl ether) can be pumped into the reactor if desired. The aqueous medium is typically stirred to obtain a desired polymerization reaction rate and uniform incorporation of comonomer, if present. Chain transfer agents can be introduced into the reactor when molecular weight control is desired.

In one embodiment of the present invention, the aqueous fluoropolymer dispersion is polymerized in the presence of hydrocarbon surfactant. Hydrocarbon surfactant is preferably present in the fluoropolymer dispersion because the aqueous fluoropolymer dispersion is polymerized in the presence of hydrocarbon surfactant, i.e., hydrocarbon surfactant is used as a stabilizing surfactant during polymerization. If desired fluorosurfactant such a fluoroalkane carboxylic acid or salt or fluoroether carboxylic acid or salt may be employed as stabilizing surfactant together with hydrocarbon surfactant and therefore may also present in the aqueous fluoropolymer dispersion produced. Preferably for the practice of the present invention, the fluoropolymer dispersion is preferably free of halogen-containing surfactant such as fluorosurfactant, i.e., contains less than about 300 ppm, and more preferably less than about 100 ppm, and most preferably less than 50 ppm, or halogen-containing surfactant.

In a polymerization process employing hydrocarbon surfactant as the stabilizing surfactant, addition of the stabilizing surfactant is preferably delayed until after the kickoff has occurred. The amount of the delay will depend on the surfactant being used and the fluoromonomer being polymerized. In addition, it is preferably for the hydrocarbon surfactant to be fed into the reactor as the polymerization proceeds, i.e., metered. The amount of hydrocarbon surfactant present in the aqueous fluoropolymer dispersion produced is preferably 10 ppm to about 50,000 ppm, more preferably about 50 ppm to about 10,000 ppm, most preferably about 100 ppm to about 5000 ppm, based on fluoropolymer solids.

If desired, the hydrocarbon surfactant can be passivated prior to, during or after addition to the polymerization reactor. Passivating means to reduce the telogenic behavior of the hydrocarbon-containing surfactant. Passivation may be carried out by reacting said the hydrocarbon-containing surfactant with an oxidizing agent, preferably hydrogen peroxide or polymerization initiator. Preferably, the passivating of the hydrocarbon-containing surfactant is carried out in the presence of a passivation adjuvant, preferably metal in the form of metal ion, most preferably, ferrous ion or cuprous ion.

After completion of the polymerization when the desired amount of dispersed fluoropolymer or solids content has been achieved (typically several hours in a batch process), the feeds are stopped, the reactor is vented, and the raw dispersion of fluoropolymer particles in the reactor is transferred to a cooling or holding vessel.

The solids content of the aqueous fluoropolymer dispersion as polymerized produced can range from about 10% by weight to up to about 65 wt % by weight but typically is about 20% by weight to 45% by weight. Particle size (Dv(50)) of the fluoropolymer particles in the aqueous fluoropolymer dispersion can range from 10 nm to 400 nm, preferably Dv(50) about 100 to about 400 nm.

Isolation of the fluoropolymer includes separation of wet fluoropolymer resin from the aqueous fluoropolymer dispersion. Separation of the wet fluoropolymer resin from the aqueous fluoropolymer dispersion can be accomplished by a variety of techniques including but not limited to gelation, coagulation, freezing and thawing, and solvent aided pelletization (SAP). When separation of wet fluoropolymer resin is carried out by coagulation, the as polymerized dispersion may first be diluted from its as polymerized concentration. Stirring is then suitably employed to impart sufficient shear to the dispersion to cause coagulation and thereby produce undispersed fluoropolymer. Salts such as ammonium carbonate can be added to the dispersion to assist with coagulation if desired. Filtering can be used to remove at least a portion of the aqueous medium from the wet fluoropolymer resin. Separation can be performed by solvent aided pelletization as described in U.S. Pat. No. 4,675,380 which produces granulated particles of fluoropolymer.

Isolating the fluoropolymer typically includes drying to remove aqueous medium which is retained in the fluoropolymer resin. After wet fluoropolymer resin is separated from the dispersion, fluoropolymer resin in wet form can include significant quantities of the aqueous medium, for example, up to 60% by weight. Drying removes essentially all of the aqueous medium to produce fluoropolymer resin in dry form. The wet fluoropolymer resin may be rinsed if desired and may be pressed to reduce aqueous medium content to reduce the energy and time required for drying.

For melt processible fluoropolymers, wet fluoropolymer resin is dried and used directly in melt-processing operations or processed into a convenient form such as chip or pellet for use in subsequent melt-processing operations. Certain grades of PTFE dispersion are made for the production of fine powder. For this use, the dispersion is coagulated, the aqueous medium is removed and the PTFE is dried to produce fine powder. For fine powder, conditions are suitably employed during isolation which do not adversely affect the properties of the PTFE for end use processing. The shear in the dispersion during stirring is appropriately controlled and temperatures less than 200° C., well below the sintering temperature of PTFE, are employed during drying.

Reduction of Thermally Induced Discoloration

To reduce thermally induced discoloration in accordance with the present invention, the aqueous fluoropolymer dispersion is exposed to ultraviolet light in the presence of an oxygen source. Preferably, the process of the invention reduces the thermally induced discoloration by at least about 10% as measured by % change in L* on the CIELAB color scale. As discussed in detail in the Test Methods which follow, the % change in L* of fluoropolymer resin samples is determined using the CIELAB color scale specified by International Commission on Illumination (CIE). More preferably, the process reduces the thermally induced discoloration by about 20% as measured by % change in L*, still more preferably at least about 30%, and most preferably at least about 50%.

For the practice of the present invention, the aqueous fluoropolymer dispersion is preferably first diluted with water to a concentration less than the concentration of the as polymerized aqueous fluoropolymer dispersion because, depending upon the equipment used, exposure of ultraviolet light can be more effective for reducing discoloration for dilute dispersions. Preferred concentrations are about 2 weight percent to about 30 weight percent, more preferably about 2 weight percent to about 20 weight percent.

Ultraviolet light has a wavelength range or about 10 nm to about 400 nm and has been described to have bands including: UVA (315 nm to 400 nm), UVB (280 nm to 315 nm), and UVC (200 nm to 280 nm). Preferably, the ultraviolet light employed has a wavelength in the UVC band.

Any of various types of ultraviolet lamps can be used as the source of ultraviolet light. For example, submersible UV clarifier/sterilizer units sold for the purposes of controlling algae and bacterial growth in ponds are commercially available may be used for the practice of the present invention. These units include a low pressure mercury vapor UVC lamp within a housing for the circulation of water. The lamp is protected by a quartz tube so that water can be circulated within the housing for exposure to ultraviolet light. Submersible UV clarifier/sterilizer units of this type are sold by under the brand name Pondmaster by Danner Manufacturing, Inc. of Islandia N.Y. For continuous treatment processes, the dispersion can be circulated though units of this type to expose the dispersion to ultraviolet light. Single pass or multiple pass treatments can be employed.

Dispersion can also be processed in a batch operation in a container suitable for exposure to ultraviolet light in the presence of an oxygen source. In this form of the invention, it is desirable for a suitably protected ultraviolet lamp to be immersed in the dispersion. For example, a vessel normally used for coagulation of the aqueous fluoropolymer dispersion to produce fluoropolymer resin can be used for carrying out the process of the invention by immersing the ultraviolet lamp in the dispersion held in this vessel. The dispersion can be circulated or stirred if desired to facilitate exposure to the ultraviolet light. When the oxygen source is a gas as discussed below, circulation may be achieved or enhanced by sparging the oxygen source into the dispersion. Ultraviolet lamps with protective quartz tubes of the type employed in the submersible UV clarifier/sterilizer units can be employed for immersion in dispersion after being removed from their housing. Other ultraviolet lamps such as medium pressure mercury vapor lamps can also be used with the lamp suitably protected for immersion in the dispersion such as by enclosing the lamp in a quartz photowell. A borosilicate glass photowell can also be used although it may decrease effectiveness by filtering ultraviolet light in the UVC and UVB bands. Suitable medium pressure mercury vapor lamps are sold by Hanovia of Fairfield, N.J.

As used in this application, "oxygen source" means any chemical source of available oxygen. "Available oxygen" means oxygen capable of reacting as an oxidizing agent. The oxygen source employed in accordance with the present invention is preferably selected from the group consisting of air, oxygen rich gas, ozone containing gas and hydrogen peroxide. "Oxygen rich gas" means pure oxygen and gas mixtures containing greater than about 21% oxygen by volume, preferably oxygen enriched air. Preferably, oxygen rich gas contains at least about 22% oxygen by volume. "Ozone containing gas" means pure ozone and gas mixtures containing ozone, preferably ozone enriched air. Preferably, the content of ozone in the gas mixture is at least about 10 ppm ozone by volume.

For the practice of the present invention, one preferred oxygen source is an ozone containing gas. Another preferred oxygen source is for the practice of the present invention is hydrogen peroxide. For providing the presence of the oxygen source in the dispersion during exposure to ultraviolet light, air, oxygen rich gas or ozone containing gas can be sparged continuously or intermittently into the dispersion, preferably in stoichiometric excess, to provide the oxygen source during the exposure to ultraviolet light. Hydrogen peroxide can be added to the dispersion, also preferably in stoichiometric excess, by adding hydrogen peroxide solution. The concentration of hydrogen peroxide is preferably about 0.1 weight % to about 10 weight % based on fluoropolymer solids in the dispersion.

Ultraviolet light with an oxygen source is effective at ambient or moderate temperatures and thus elevated temperatures are typically not required for the practice of the present invention. In a preferred process in accordance with the invention, exposing the aqueous fluoropolymer dispersion to ultraviolet light in the presence of an oxygen source is carried out at a temperature of about 5° C. to about 70° C., preferably about 15° C. to about 70° C.

The process of the invention is useful for fluoropolymer resin which exhibits thermally induced discoloration which may range from mild to severe. The process is especially useful for aqueous fluoropolymer dispersion which contains hydrocarbon surfactant which causes the thermally induced discoloration, preferably aqueous fluoropolymer dispersion that is polymerized in the presence of hydrocarbon surfactant.

The process of the invention is especially useful when the fluoropolymer resin prior to treatment exhibits significant thermally induced discoloration compared to equivalent commercial fluoropolymers. The invention is advantageously employed when the fluoropolymer resin has an initial thermally induced discoloration value ($L^*_i$) at least about 4 L units below the L* value of equivalent fluoropolymer resin of commercial quality manufactured using ammonium perfluorooctanoate fluorosurfactant. The invention is more advantageously employed when the L* value is about 5 units below the L* value of such equivalent fluoropolymer resin, even more advantageously employed when the L* value is 8 units below the L* value of such equivalent fluoropolymer resin, still more advantageously employed when the L* value is 12 units below the L* value of such equivalent fluoropolymer resin, and most advantageously employed when the L* value is 20 units below the L* value of such equivalent fluoropolymer resin.

After the aqueous fluoropolymer dispersion is treated in accordance with the process of the invention, normal procedures for isolating the polymer as discussed above can be used. The resulting fluoropolymer resin is suitable for end use applications appropriate for the particular type of fluoropolymer resin. Fluoropolymer resin produced by employing the present invention exhibits reduced thermally induced discoloration without detrimental effects on end use properties.

Test Methods

Raw Dispersion Particle Size (RDPS) of polymer particles is measured using a Zetasizer Nano-S series dynamic light scattering system manufactured by Malvern Instruments of Malvern, Worcestershire, United Kingdom. Samples for analysis are diluted to levels recommended by the manufacturer in 10×10×45 mm polystyrene disposable cuvettes using deionized water that has been rendered substantially free of particles by passing it through a sub-micron filter. The sample is placed in the Zetasizer for determination of Dv(50). Dv(50) is the median particle size based on volumetric particle size distribution, i.e. the particle size below which 50% of the volume of the population resides.

The melting point ($T_m$) of melt-processible fluoropolymers is measured by Differential Scanning calorimeter (DSC) according to the procedure of ASTM D 4591-07 with the melting temperature reported being the peak temperature of the endotherm of the second melting. For PTFE homopolymer, the melting point is also determined by DSC. The unmelted PTFE homopolymer is first heated from room temperature to 380° C. at a heating rate of 10° C. and the melting temperature reported is the peak temperature of the endotherm on first melting.

Comonomer content is measured using a Fourier Transform Infrared (FTIR) spectrometer according to the method disclosed in U.S. Pat. No. 4,743,658, col. 5, lines 9-23 with the following modifications. The film is quenched in a hydraulic press maintained at ambient conditions. The comonomer content is calculated from the ratio of the appropriate peak to the fluoropolymer thickness band at 2428 $cm^{-1}$ calibrated using a minimum of three other films from resins analyzed by fluorine 19 NMR to establish true comonomer content. For instance, the % HFP content is determined from the absorbance of the HFP band at 982 $cm^{-1}$, and the PEVE content is determined by the absorbance of the PEVE peak at 1090 $cm^{-1}$.

Melt flow rate (MFR) of the melt-processible fluoropolymers are measured according to ASTM D 1238-10, modified as follows: The cylinder, orifice and piston tip are made of a corrosion-resistant alloy, Haynes Stellite 19, made by Haynes Stellite Co. The 5.0 g sample is charged to the 9.53 mm (0.375 inch) inside diameter cylinder, which is maintained at 372° C.±1° C., such as disclosed in ASTM D 2116-07 for FEP and ASTM D 3307-10 for PFA. Five minutes after the sample is charged to the cylinder, it is extruded through a 2.10 mm (0.0825 inch) diameter, 8.00 mm (0.315 inch) long square-edge orifice under a load (piston plus weight) of 5000 grams. Other fluoropolymers are measured according to ASTM D 1238-10 at the conditions which are standard for the specific polymer.

Measurement of Thermally Induced Discoloration

1) Color Determination

The L* value of fluoropolymer resin samples is determined using the CIELAB color scale, details of which are published in CIE Publication 15.2 (1986). CIE L*a*b* (CIELAB) is the color space specified by the International Commission on Illumination (French Commission internationale de l'éclairage). It describes all the colors visible to the human eye. The three coordinates of CIELAB represent the lightness of the color (L*), its position between red/magenta and green (a*), and its position between yellow and blue (b*).

2) PTFE Sample Preparation and Measurement

The following procedure is used to characterize the thermally induced discoloration of PTFE polymers including modified PTFE polymers. 4.0 gram chips of compressed PTFE powder are formed using a Carver stainless steel pellet mold (part #2090-0) and a Carver manual hydraulic press (model 4350), both manufactured by Carver, Inc. of Wabash, Ind. In the bottom of the mold assembly is placed a 29 mm diameter disk of 0.1 mm thick Mylar film. 4 grams of dried PTFE powder are spread uniformly within the mold opening poured into the mold and distributed evenly. A second 29 mm disk is placed on top of the PTFE and the top plunger is placed in the assembly. The mold assembly is placed in the press and pressure is gradually applied until 8.27 MPa (1200 psi) is attained. The pressure is held for 30 seconds and then released. The chip mold is removed from the press and the chip is removed from the mold. Mylar films are pealed from the chip before subsequent sintering. Typically for each polymer sample, two chips are molded.

An electric furnace is heated is heated to 385° C. Chips to be sintered are placed in 4 inch×5 inch (10.2 cm×12.7 cm) rectangular aluminum trays which are 2 inches (5.1 cm) in depth. The trays are placed in the furnace for 10 minutes after which they are removed to ambient temperature for cooling.

4 gm chips processed as described above are evaluated for color using a HunterLab Color Quest XE made by Hunter Associates Laboratory, Inc. of Reston, Va. The Color Quest XE sensor is standardized with the following settings, Mode: RSIN, Area View: Large and Port Size: 2.54 cm. The instrument is used to determine the L* value of fluoropolymer resin samples using the CIELAB color scale.

For testing, the instrument is configured to use CIELAB scale with D65 Illuminant and 10° Observer. The L* value reported by this colorimeter is used to represent developed color with L* of 100 indicating a perfect reflecting diffuser (white) and L* of 0 representing black.

An equivalent fluoropolymer resin of commercial quality manufactured using ammonium perfluorooctanoate fluorosurfactant is used as the standard for color measurements. For the Examples in this application illustrating the invention for PTFE fluoropolymer, an equivalent commercial qualtity PTFE product made using ammonium perfluorooctanoate fluorosurfactant as the dispersion polymerization surfactant is TEFLON® 601A. Using the above measurement process, the resulting color measurement for TEFLON® 601A is $L^*_{Std-PTFE}=87.3$ 3) Melt-Processible Fluoropolymers Sample Preparation and Measurement The following procedure is used to characterize discoloration of melt-processible fluoropolymers, such as FEP and PFA, upon heating. A 10.16 cm (4.00 inch) by 10.16 cm (4.00 inch) opening is cut in the middle of a 20.32 cm (8.00 inch) by 20.32 cm (8.00 inch) by 0.254 mm (0.010 inch) thick metal sheet to form a chase. The chase is placed on a 20.32 cm (8.00 inch) by 20.32 cm (8.00 inch) by 1.59 mm (1/16 inch) thick molding plate and covered with Kapton® film that is slightly larger than the chase. The polymer sample is prepared by reducing size, if necessary, to no larger than 1 mm thick and drying. 6.00 grams of polymer sample is spread uniformly within the mold opening. A second piece of Kapton® film that is slightly larger than the chase is placed on top of the sample and a second molding plate, which has the same dimensions as the first, is placed on top of the Kapton® film to form a mold assembly. The mold assembly is placed in a P-H-I 20 ton hot press model number SP-210C-X4A-21 manufactured by Pasadena Hydraulics Incorporated of El Monte, Calif. that is set at 350° C. The hot press is closed so the plates are just contacting the mold assembly and held for 5 minutes. The pressure on the hot press is then increased to 34.5 MPa (5,000 psi) and held for an additional 1 minute. The pressure on the hot press is then increased from 34.5 MPa (5,000 psi) to 137.9 MPa (20,000 psi) over the time span of 10 seconds and held for an additional 50 seconds after reaching 137.9 MPa (20,000 psi). The mold assembly is removed from the hot press, placed between the blocks of a P-H-I 20 ton hot press model number P-210H manufactured by Pasadena Hydraulics Incorporated that is maintained at ambient temperature, the pressure is increased to 137.9 MPa (20,000 psi), and the mold assembly is left in place for 5 minutes to cool. The mold assembly is then removed from the ambient temperature press, and the sample film is removed from the mold assembly. Bubble-free areas of the sample film are selected and 2.86 cm (1 1/8 inch) circles are stamped out using a 1 1/8 inch arch punch manufactured by C. S. Osborne and Company of Harrison, N.J. Six of the film circles, each of which has a nominal thickness of 0.254 mm (0.010 inch) and nominal weight of 0.37 gram are assembled on top of each other to create a stack with a combined weight of 2.2+/−0.1 gram.

The film stack is placed in a HunterLab ColorFlex spectrophotometer made by Hunter Associates Laboratory, Inc. of Reston, Va., and the L* is measured using a 2.54 cm (1.00 inch) aperture and the CIELAB scale with D65 Illuminant and 10° Observer.

An equivalent fluoropolymer resin of commercial quality manufactured using ammonium perfluorooctanoate fluorosurfactant is used as the standard for color measurements. For the Examples in this application illustrating the invention for FEP fluoropolymer resin, an equivalent commercial quality FEP resin made using ammonium perfluorooctanoate fluorosurfactant as the dispersion polymerization surfactant is DuPont TEFLON® 6100 FEP. Using the above measurement process, the resulting color measurement for DuPont TEFLON® 6100 FEP is $L^*_{Std-FEP}=79.7$.

4) % Change in L* with Respect to the Standard is Used to Characterize the Change in Thermally Induced Discoloration of the Fluoropolymer Resin After Treatment as Defined by the Following Equation $$\% \text{ change in } L^* = (L^*_t - L^*_i)/(L^*_{Std} - L^*_i) \times 100$$

$L^*_i$=Initial thermally induced discoloration value, the measured value for L on the CIELAB scale for fluoropolymer resins prior to treatment to reduce thermally induced discoloration measured using the disclosed test method for the type of fluoropolymer.

$L^*_t$=Treated thermally induced discoloration value, the measured value for L on the CIELAB scale for fluoropolymer resins after treatment to reduce thermally induced discoloration measured using the disclosed test method for the type of fluoropolymer.

Standard for PTFE: measured $L^*_{Std-PTFE}=87.3$
Standard for FEP: measured $L^*_{Std-FEP}=79.7$

EXAMPLES

Apparatus for Drying of PTFE Polymer

A laboratory dryer for simulating commercially dried PTFE Fine Powder is constructed as follows: A length of 4 inch (10.16 cm) stainless steel pipe is threaded on one end and affixed with a standard stainless steel pipe cap. In the center of the pipe cap is drilled a 1.75 inch (4.45 cm) hole through which heat and air source is introduced. A standard 4 inch (10.16 cm) pipe coupling is sawed in half along the radial axis and the sawed end of one piece is butt welded to the end of the pipe, opposite the pipe cap. Overall length of this assembly is approximately 30 inches (76.2 cm) and the assembly is mounted in the vertical position with the pipe cap at the top. For addition of a control thermocouple, the 4 inch pipe assembly is drilled and tapped for a 1/4 inch (6.35 mm) pipe fitting at a position 1.75 inch (4.45 cm) above the bottom of the assembly. A 1/4 inch (6.35 mm) male pipe thread to 1/8 inch (3.175 mm) Swagelok fitting is threaded into the assembly and drilled through to allow the tip of a 1/8 inch (3.175 mm) J-type thermocouple to be extended through the fitting and held in place at the pipe's radial center. For addition of a other gases, the 4 inch (10.16 cm) pipe assembly is drilled and tapped for a 1/4 inch (6.35 mm) pipe fitting at a position 180° from the thermocouple port and higher at 3.75 inch (9.5 cm) above the bottom of the assembly. A 1/4 inch (6.35 mm) male pipe thread to 1/4 inch (6.35 mm) Swagelok fitting is threaded into the assembly and drilled through to allow the open end of a 1/4 inch (6.35 mm) stainless steel tube to be extended through the fitting and held in place at the pipe's radial center. The entire pipe assembly is wrapped with heat resistant insulation that can easily withstand 200° C. continuous duty.

The dryer bed assembly for supporting polymer is constructed as follows: A 4 inch (10.16 cm) stainless steel pipe nipple is sawed in half along the radial axis and onto the sawed end of one piece is tack welded stainless steel screen with 1.3 mm wire size and 2.1 mm square opening. Filter media of polyether ether ketone (PEEK) or Nylon 6,6 fabric is cut into a 4 inch (10.16 cm) disk and placed on the screen base. A 4 inch (10.16 cm) disk of stainless steel screen is placed on top of the filter fabric to hold it securely in place. Fabrics used include a Nylon 6,6 fabric and PEEK fabric having the characteristics described in U.S. Pat. No. 5,391,709. In operation, approximately ¼ inch (6.35 mm) of polymer is placed uniformly across the filter bed and the dryer bed assembly is screwed into the bottom of the pipe assembly.

The heat and air source for this drying apparatus is a Master heat gun, model HG-751B, manufactured by Master Appliance Corp. of Racine, Wis. The end of this heat gun can be snuggly introduced through and supported by the hole in the cap at the top of the pipe assembly. Control of air flow is managed by adjusting a damper on the air intake of the heat gun. Control of temperature is maintained by an ECS Model 800-377 controller, manufactured by Electronic Control Systems, Inc of Fairmont W. Va. Adaptation of the controller to the heat gun is made as follows: The double pole power switch of the heat gun is removed. All power to the heat gun is routed through the ECS controller. The blower power is supplied directly from the ECS controller on/off switch. The heater circuit is connected directly to the ECS controller output. The thermocouple on the pipe assembly which is positioned above the polymer bed serves as the controller measurement device.

The apparatus described above is typically used to dry PTFE Fine Powder at 170° C. for 1 hour and can easily maintain that temperature to within ±1° C.

Apparatus for Drying of FEP Polymer

Equipment similar in design to that described in Apparatus for Drying of PTFE Polymer is used except the scale is increased so the dryer bed assembly is 8 inch (20.32 cm) in diameter and the stainless steel screen is a USA standard testing sieve number 20 mesh. Unless otherwise noted, the apparatus is used to dry FEP for two hours with 180° C. air and can easily maintain that temperature to within ±1° C. Typical polymer loading is 18 grams dry weight of polymer.

A secondary dryer bed assembly is produced by the addition of three evenly spaced nozzles with a centerline 3.0 cm above the polymer bed. The nozzles can be used to introduce additional gasses to the drying air. One of many possible configurations is to connect an AQUA-6 portable ozone generator manufactured by A2Z Ozone of Louisville, Ky. to each of the nozzles.

10 Watt UVC Light Source

For experiments using 10 watt UVC light sources, the 254 nm lamps are obtained from 10 watt Pondmaster submersible UV clarifier/sterilizer units manufactured by Danner Manufacturing, Inc. of Islandia, N.Y. These units, commonly used in the aquaculture industry, consist of 4 major components: (1) A ballast which provides the proper power supply. (2) A low pressure mercury vapor lamp which emits UVC radiation upon activation. (3) A quartz tube which protects the lamp and electronics from water damage while allowing short wavelength UV light to pass. (4) A dark plastic outer housing which is threaded at one end so as to screw onto the ballast and provide a seal around the quartz tube, thereby protecting lamp and electronics from water penetration. The housing is also designed to allow water to flow from one end of the protected lamp to the other end while preventing hazardous UV light from escaping the housing. For purposes of this experimentation, the plastic housing is removed and the threaded end is removed by saw. The treaded adapter is then screwed back into the ballast, thereby sealing the quartz tube to the ballast but eliminating the black plastic UV shield. In this way the light source is made useful for batch (ie. non flow through) experiments.

Light intensity is measured with a meter that has the capability of reading up to 20.0 milliwatts/cm$^2$ (mW/cm$^2$) by positioning three sensors (245 nm UVC, 310 nm UVB and 365 nm UVA) four inches from the quartz protective tube. Measurements: UVC is 1.06 mW/cm$^2$, UVB is 33.7 microwatt/cm$^2$ and UVA is 19.2 microwatt/cm$^2$.

450 Watt Hanovia Lamp Light Source

For experiments using a 450 watt Hanovia lamp, a Model PC451.050 450 watt medium pressure mercury vapor lamp, manufactured by Hanovia, Inc. of Fairfield, N.J. is used with the following setup: An Ace Glass Incorporated, Model 6386-20, 2000 ml jacketed filter reactor body is fitted with an Ace Glass, Inc. Model 5846-60 bottom PTFE plug in which a recess is machined to support a 48 mm diameter, jacketed immersion photowell. The photowell is connected to a circulating cooling bath of sufficient capacity to keep the coolant temperature exiting the photowell below 40° C. The lamp is operated with an appropriately matched power supply such as the Ace Glass Model No. 7830-58. A quartz photowell (Ace Glass Part #7874-23) or a borosilicate photowell (Ace Glass Part #7875-30) may be used although borosilicate may decrease effectiveness by filtering some ultraviolet light in the UVC and UVB bands.

Light intensity is measured with a meter (UVP Model UVX Radiometer) that has the capability of reading up to 20.0 milliwatts/cm$^2$ (mW/cm$^2$) by positioning three sensors (245 nm UVC (UVP Model UVX-25), 310 nm UVB (UVP Model UVX-31) and 365 nm UVA (UVP Model UVX36)) 3.5 inches from the borosilicate well. When the Hanovia 450 watt lamp is fully heated up, the UVC reads 10.11 mW/cm$^2$, the UVB reads 9.37 mW/cm$^2$ and the UVA reads 17.0 mW/cm$^2$.

When similar measurement is made with the quartz photowell, even before the Hanovia 450 watt lamp is fully heated up, the light intensity is so strong at to reach the maximum measurement capability of the light meter used.

Fluoropolymer Preparation

PTFE-1 Preparation of Hydrocarbon Stabilized PTFE Dispersion

To a 12 liter, horizontally disposed, jacketed, stainless steel autoclave with a two blade agitator is added 5200 gm of deionized, deaerated water. To the autoclave is added an additional 500 gm of deionized, deaerated water which contains 0.12 gm of Pluronic® 31R1. The autoclave is sealed and placed under vacuum. The autoclave pressure is raised to 30 psig (308 kPa) with nitrogen and vented to atmospheric pressure. The autoclave is pressured with nitrogen and vented 2 more times. Autoclave agitator speed is set at 65 RPM. 20 ml of initiator solution containing 1.0 gm of ammonium persulfate (APS) per liter of deionized, deaerated water is added to the autoclave.

The autoclave is heated to 90° C. and TFE is charged to the autoclave to bring the autoclave pressure to 400 psig (2.86 MPa). 150 ml of an initiator solution composed of 11.67 gm of 70% active disuccinic acid peroxide (DSP), 0.167 gm of APS and 488.3 gm of deionized water is charged to the autoclave at 80 ml/min. After the autoclave pressure drops 10 psi (69 kPa) from the maximum pressure observed during injection of initiator solution, the autoclave pressure is brought back to 400 psig (2.86 MPa) with TFE and maintained at that pressure for the duration of the polymerization.

After 100 gm of TFE has been fed since kickoff, an aqueous surfactant solution containing 5733 ppm of SDS hydrocarbon stabilizing surfactant and 216 ppm of iron sulfate heptahydrate is pumped to the autoclave at a rate of 4 ml/min until 185 ml of surfactant solution has been added. After approximately 70 minutes since kickoff, 1500 gm of TFE has been added to the autoclave. The agitator is stopped, the autoclave is vented to atmospheric pressure and the dispersion is cooled and discharged. Solids content of the dispersion is 18-19 wt %. Dv(50) raw dispersion particle size (RDPS) is 208 nm.

PTFE-2: Preparation of Hydrocarbon Stabilized PTFE Dispersion

To a 12 liter, horizontally disposed, jacketed, stainless steel autoclave with a two blade agitator is added 5200 gm of deionized, deaerated water and 250 gm of wax. To the autoclave is added an additional 500 gm of deionized, deaerated water which contains 0.085 gm of Pluronic® 31R1 and 0.2 gm of sodium sulfite. The autoclave is sealed and placed under vacuum. The autoclave pressure is raised to 30 psig (308 kPa) with nitrogen and vented to atmospheric pressure. The autoclave is pressured with nitrogen and vented 2 more times. Autoclave agitator speed is set at 65 RPM. 70 ml of initiator solution containing 0.5 gm of ammonium persulfate (APS) per liter of deionized, deaerated water is added to the autoclave.

The autoclave is heated to 90° C. and TFE is charged to the autoclave to bring the autoclave pressure to 400 psig (2.86 MPa). 150 ml of an initiator solution composed of 16.67 gm of 70% active disuccinic acid peroxide (DSP), 0.167 gm of APS and 488.3 gm of deionized water is charged to the autoclave at 80 ml/min. After the autoclave pressure drops 10 psi (69 kPa) from the maximum pressure observed during injection of initiator solution, the autoclave pressure is brought back to 400 psig (2.86 MPa) with TFE and maintained at that pressure for the duration of the polymerization. After 300 gm of TFE has been fed since kickoff, an aqueous surfactant solution containing 0.8 wt % of SDS hydrocarbon stabilizing surfactant is pumped to the autoclave at a rate of 2 ml/min until a total of 2200 gm of TFE has been fed since kickoff. After approximately 150 minutes since kickoff, 2200 gm of TFE and 270 ml of stabilizing surfactant solution has been added to the autoclave. The agitator is stopped, the autoclave is vented to atmospheric pressure and the dispersion is discharged. Dispersion thus obtained contains 26-27 wt % PTFE polymer. Dv(50) raw dispersion particle size (RDPS) is 210 nm.

Isolation of PTFE Dispersion

To a clean glass resin kettle having internal dimensions 17 cm deep and 13 cm in diameter is charged 600 gm of 5 wt % dispersion. The dispersion is agitated with a variable speed, IKA Works, Inc., RW20 digital overhead stirrer affixed with a 6.9 cm diameter, rounded edge three blade impeller having a 45° downward pumping pitch. The following sequence is executed until the dispersion has completely coagulated as indicated by the separation of white PTFE polymer from a clear aqueous phase: At time zero, agitation speed is set at 265 revolutions per minute (RPM) and 20 ml of a 20 wt % aqueous solution of ammonium carbonate is slowly added to the resin kettle. At 1 minute from time zero, the agitator speed is raised to 565 RPM and maintained until the dispersion is completely coagulated. Once coagulated, the clear aqueous phase is removed by suction and 600 ml of cold (approximately 6° C.), deionized water is added. The slurry is agitated at 240 RPM for 5 minutes until agitation is halted and the wash water removed from the resin kettle. This washing procedure is repeated two more times with the final wash water being separated from the polymer by vacuum filtration as indicated below.

A ceramic filtration funnel (10 cm internal diameter) is placed on a vacuum flask with rubber sealing surface. A 30 cm by 30 cm lint free nylon filter cloth is placed in the filtration funnel and the washed polymer and water is poured into the funnel. A vacuum is pulled on the vacuum flask and once the wash water is removed, 1200 ml of additional deionized water is poured over the polymer and pulled through the polymer into the vacuum flask. Polymer thus coagulated, washed and isolated is removed from the filter cloth for further processing.

FEP: Preparation of Hydrocarbon Stabilized TFE/HFP/PEVE Dispersion

A cylindrical, horizontal, water-jacketed, paddle-stirred, stainless steel reactor having a length to diameter ratio of about 1.5 and a water capacity of 10 gallons (37.9 L) is charged with 60 pounds (27.2 kg) of deionized water. The reactor temperature then is increased to 103° C. while agitating at 46 rpm. The agitator speed is reduced to 20 rpm and the reactor is vented for 60 seconds. The reactor pressure is increased to 15 psig (205 kPa) with nitrogen. The agitator speed is increased to 46 rpm while cooling to 80° C. The agitator speed is reduced to 20 rpm and a vacuum is pulled to 12.7 psi (87.6 kPa). A solution containing 500 ml of deaerated deionized water, 0.5 grams of Pluronic® 31R1 solution and 0.3 g of sodium sulfite is drawn into the reactor. With the reactor paddle agitated at 20 rpm, the reactor is heated to 80° C., evacuated and purged three times with TFE. The agitator speed is increased to 46 rpm and the reactor temperature then is increased to 103° C. After the temperature has become steady at 103° C., HFP is added slowly to the reactor until the pressure is 430 psig (3.07 MPa). 112 ml of liquid PEVE is injected into the reactor. Then TFE is added to the reactor to achieve a final pressure of 630 psig (4.45 MPa). Then 80 ml of freshly prepared aqueous initiator solution containing 2.20 wt % of ammonium persulfate (APS) is charged into the reactor. Then, this same initiator solution is pumped into the reactor at a TFE to initiator solution mass ratio of twenty-to-one for the remainder of the polymerization after polymerization has begun as indicated by a 10 psi (69 kPa) drop in reactor pressure, i.e. kickoff. Additional TFE is also added to the reactor beginning at kickoff at a rate of 0.06 lb/min (0.03 kg/min) subject to limitation in order to prevent the reactor from exceeding the maximum desired limit of 650 psig (4.58 MPa) until a total of 12.0 lb (5.44 kg) of TFE has been added to the reactor after kickoff. Furthermore, liquid PEVE is added to the reactor beginning at kickoff at a rate of 0.3 ml/min for the duration of the reaction.

After 4.0 lb (1.8 kg) of TFE has been fed since kickoff, an aqueous surfactant solution containing 45,176 ppm of SDS hydrocarbon stabilizing surfactant and 60,834 ppm of 30% ammonium hydroxide solution is pumped to the autoclave at a rate of 0.2 ml/min. The aqueous surfactant solution pumping rate is increased to 0.3 ml/min after 6.0 lb (2.7 kg) of TFE has been fed since kickoff, then to 0.4 ml/min after 8.0 lb (3.6 kg) of TFE has been fed since kickoff, to 0.6 ml/min after 10.0 lb (4.5 kg) of TFE has been fed since kickoff, and finally to 0.8 ml/min after 11.0 lb (5.0 kg) of TFE has been fed since kickoff resulting in a total of 47 ml of surfactant solution added during reaction. The total reaction time is 201 minutes after initiation of polymerization during which 12.0 lb (5.44 kg) of TFE and 60 ml of PEVE are added. At the end of the reaction period, the TFE feed, PEVE feed, the initiator feed and surfactant solution feed are stopped; an additional 25 ml of surfactant solution is added to the reactor, and the reactor is cooled while maintaining agitation. When the temperature of the reactor contents reaches 90° C., the reactor is slowly vented. After venting to nearly atmospheric pressure, the reactor is purged with nitrogen to remove residual monomer. Upon further cooling, the dispersion is discharged from the reactor at below 70° C.

Solids content of the dispersion is 20.07 wt % and Dv(50) raw dispersion particle size (RDPS) is 143.2 nm. 703 grams of wet coagulum is recovered on cleaning the autoclave. The TFE/HFP/PEVE terpolymer (FEP) has a melt flow rate (MFR) of 29.6 gm/10 min, an HFP content of 9.83 wt %, a PEVE content of 1.18 wt %, and a melting point of 256.1° C.

Isolation of FEP Dispersion

The dispersion is coagulated by freezing the dispersion at −30° C. for 16 hours. The dispersion is thawed and the water is separated from the solids by filtering through a 150 micron mesh filter bag model NMO150P1SHS manufactured by The Strainrite Companies of Auburn, Me.

Thermally Induced Discoloration

Dried polymer is characterized as described above in the Test Methods—Measurement of Thermally Induced Discoloration as applicable to the type of polymer used in the following Examples.

Comparative Example 1

PTFE with Hydrocarbon Stabilizing Surfactant No Treatment

A quantity of PTFE-1 Dispersion as described above is diluted to 5 wt % solids with deionized water. The dispersion is coagulated and isolated via the method described above (Isolation of PTFE Dispersion). Polymer thus obtained is then dried at 170° C. for 1 hour using the PTFE drier described above (Apparatus for Drying of PTFE Polymer). Dried polymer is characterized for thermally induced discoloration as described in the Test Methods Measurement of Thermally Induced Discoloration for PTFE. Resulting value for $L^*_i$ is 43.9, indicating extreme discoloration of the polymer upon thermal processing for untreated polymer. The measured color is shown in Table 1.

Comparative Example 2

PTFE—UVC Alone for 3 Hours

To a glass beaker is added 153 gm of PTFE-1 dispersion as described above having 19.61% solids. The net weight is raised to 600 gm with deionized water, thus reducing the % solids to 5 wt %. A total of 1800 grams of dispersion thus prepared is added to a 2000 ml jacketed resin kettle. The dispersion is heated to 40° C. with gentle agitation. Two 10 watt 254 nm UV lights are immersed in the dispersion. The lights are energized for 3 hours. The resulting, treated dispersion is coagulated and isolated as described above, dried in the apparatus for drying of PTFE polymers and finally evaluated for thermally induced discoloration. L* obtained for this polymer is 36.7 thereby giving a negative % change in L* of −16.6%. The measured color is shown in Table 1.

Example 1

PTFE UVC, Ozone Injection, 3 Hours

To a glass beaker is added 153 gm of PTFE-1 dispersion as described above having 19.6% solids. The net weight is raised to 600 gm with deionized water, thus reducing the % solids to 5 wt %. A total of 1800 grams of dispersion thus prepared is added to a 2000 ml jacketed resin kettle. The dispersion is heated to 40° C. with agitation aided by continuous injection with ozone enriched air through two sintered glass, fine bubble, injection tubes. Ozone thus injected is provided by a Clearwater Technologies, Inc. Model CD-10 ozone generator which is operated at maximum power with an air feed rate of 100 cc/min. Two 10 watt 254 nm UV lights as described in 10 watt UVC Light Source are immersed in the dispersion. The lights are energized for 3 hours. The resulting, treated dispersion is coagulated and isolated as described above, dried in the apparatus for drying of PTFE polymers and finally evaluated for thermally induced discoloration. L* obtained for this polymer is 62.4 with a % change in L* of 42.6% indicating a much improved color after treatment. The measured color is shown in Table 1.

Example 2

PTFE UVC, $O_2$ Injection, 3 Hours

Example 1 is repeated except pure oxygen is injected to the dispersion during exposure to UVC light. The resulting L* is 60.1 providing a % change in L* of 37.3%, indicating a much improved color after treatment. The measured color is shown in Table 1.

Example 3

PTFE UVC, Air Injection, 3 Hours

Example 1 is repeated except air is injected to the dispersion during exposure to UVC light. The resulting L* is 54.7, providing a % change in L* of 24.9%, indicating a much improved color after treatment. The measured color is shown in Table 1.

Example 4

PTFE, UVC, 1 Wt % $H_2O$ on Polymer, $O_2$ Injection, 3 Hours, 60° C.

To a glass beaker is added 155 gm of PTFE-1 as described above having 19.4% solids and 1.0 gm of 30 wt % hydrogen peroxide. The net weight is raised to 600 gm with deionized water, thus reducing the % solids to 5 wt %. A total of 1800 grams of dispersion thus prepared is added to a 2000 ml jacketed resin kettle. The dispersion is heated to 60° C. with agitation aided by continuous injection with 100 cc/min of oxygen through two sintered glass, fine bubble, injection tubes. Two 10 watt 254 nm UV lights as described in 10 watt UVC Light Source are immersed in the dispersion. The lights are energized for 3 hours. The resulting, treated dispersion is coagulated and isolated as described above, dried in the apparatus for drying of PTFE polymers and finally evaluated for thermally induced discoloration. L* obtained for this polymer is 75.9 providing a % change in L* of 73.7%, indicating a much improved color after treatment. The measured color is shown in Table 1.

Example 5

PTFE, UVC, 1 Wt % $H_2O_2$ on Polymer, $O_2$ Injection, 3 Hours, 40° C.

Example 4 is repeated except the dispersion is heated to 40° C. The resulting L* is 78.1, providing % change in L* of 78.8%, indicating a much improved color after treatment. The measured color is shown in Table 1.

Example 6

PTFE, UVC, 1 Wt % $H_2O_2$ on Polymer, No Injection, 3 Hours, 40° C.

Example 5 is repeated except no gas is injected to the dispersion during exposure to UVC light. The resulting L* is 75.6, % change in L* of 73.0%, indicating a much improved color after treatment. The measured color is shown in Table 1.

Example 7

PTFE, Hanovia 450 Watt, 1 Wt % $H_2O_2$ on Poly, Air Injection, 30 Min, Borosilicate Photowell

To a glass beaker is added 153 gm of PTFE-1 dispersion having 19.6% solids. 1.0 gm of 30 wt % hydrogen peroxide is added to the dispersion. The net weight is raised to 600 gm with deionized water, thus reducing the % solids to 5 wt %. A total of 1200 grams of dispersion thus prepared is added to a 2000 ml reactor affixed with a borosilicate photowell described above in the description of the 450 watt Hanovia Lamp Light Source.

The dispersion is agitated by continuous injection with air through two sintered glass, fine bubble, injection tubes. A 450 watt Hanovia lamp is placed in the photowell and is energized for 30 minutes. After treatment, the resulting dispersion temperature has risen from ambient temperature to 33° C. The dispersion is coagulated and isolated as described above, dried in the apparatus for drying of PTFE polymers, and finally evaluated for thermally induced discoloration. L* obtained for this polymer is 51.8 thereby giving a % change in L* of 18.2%, indicating a much improved color after treatment. The measured color is shown in Table 1.

Example 8

PTFE, Hanovia 450 Watt, 1 Wt % $H_2O_2$ on Poly, Air Injection, 30 Min, Quartz Photowell

Example 7 is repeated except that a quartz photowell as described above is used rather than a borosilicate photowell. The resulting L* is 79.5, providing a % change in L* of 82.0%, indicating a much improved color after treatment. The measured color is shown in Table 1.

Example 9

PTFE, Hanovia 450 Watt, 1 Wt % $H_2O_2$ on Poly, Air Injection, 30 Min, Quartz Photowell, PTFE

To a glass beaker is added 113.2 gm of PTFE-2 dispersion having 26.5% solids. 1.0 gm of 30 wt % hydrogen peroxide is added to the dispersion. The net weight is raised to 600 gm with deionized water, thus reducing the % solids to 5 wt %. A total of 1200 grams of dispersion thus prepared is added to a 2000 ml reactor affixed with a quartz photowell described above in the description of the 450 watt Hanovia Lamp Light Source. The dispersion is agitated by continuous injection with air through two sintered glass, fine bubble, injection tubes. A 450 watt Hanovia lamp is placed in the photowell and is energized for 30 minutes. After treatment, the resulting dispersion temperature has risen from ambient temperature to 37° C. The dispersion is coagulated and isolated as described above, dried in the apparatus for drying of PTFE polymers, and finally evaluated for discoloration. L* obtained for this polymer is 60.4 providing a % change in L* of 38.0%, indicating a much improved color after treatment. The measured color is shown in Table 1.

TABLE 1

| PTFE | | |
|---|---|---|
| Examples | L* | % change of L* |
| Comparative Example 1 (no treatment) | 43.9 | |
| Comparative Example 2 | 36.7 | −16.6% |
| Example 1 | 62.4 | 42.6% |
| Example 2 | 60.1 | 37.3% |
| Example 3 | 54.7 | 24.9% |
| Example 4 | 75.9 | 73.7% |
| Example 5 | 78.1 | 78.8% |
| Example 6 | 75.6 | 73.0% |
| Example 7 | 51.8 | 18.2% |
| Example 8 | 79.5 | 82.0% |
| Example 9 | 60.4 | 38.0% |

Comparative Example 3

FEP with Hydrocarbon Stabilizing Surfactant—No Treatment

Aqueous FEP dispersion polymerized as described above is diluted to 5 weight percent solids with deionized water. The dispersion is coagulated by freezing the dispersion at −30° C. for 16 hours. The dispersion is thawed and the water is separated from the solids by filtering through a 150 micron mesh filter bag model NMO150P1SHS manufactured by The Strainrite Companies of Auburn, Me. The solids are dried for 2 hours with 180° C. air in the equipment described under "Apparatus for Drying of FEP Polymer". The dried powder is molded to produce color films as described in Test Methods Measurement of Thermally Induced Discoloration for Melt-Processible Fluoropolymers. Resulting value for $L^*_i$ is 44.8, indicating discoloration of the polymer upon thermal processing of untreated polymer. The measured color is shown in Table 2.

Example 10

FEP—Treatment with UVC+Ozone Injection

Aqueous FEP dispersion polymerized as described above is diluted to 5 weight percent solids with deionized water and preheated to 40° C. in a water bath. A fresh $FeSO_4$ solution is prepared by diluting 0.0150 g of $FeSO_4\text{-}7H_2O$ to 100 ml using deaerated deionized water. 1200 ml of the FEP dispersion, 4 ml of the $FeSO_4$ solution, and 2 ml of 30 wt % $H_2O_2$ are added to a 2000 ml jacketed glass reactor with internal diameter of 10.4 cm, which has 40° C. water circulating through the reactor jacket, and the contents are mixed. Two injection tubes that each have a 12 mm diameter by 24 mm long, fine-bubble, fritted-glass cylinder produced by LabGlass as part number 8680-130 are placed in the reactor, and each is connected to an AQUA-6 portable ozone generator manufactured by A2Z Ozone of Louisville, Ky. The ozone generators are turned on and used to bubble 1.18 standard L/min (2.5 standard ft³/hr) of ozone enriched air through the dispersion. The dispersion is allowed to equilibrate for 5 minutes. A 10 watt UVC light as described in 10 watt UVC Light Source is placed in the reactor. The UVC lamp is turned on to illuminate the dispersion while injecting ozone enriched air and controlling temperature at 40° C. After three hours, the lamp is extinguished and the injection gas is stopped. The dispersion is coagulated, filtered, dried and molded as described in Comparative Example 3. L* obtained for this polymer is 58.4 with a % change in L* of 39.0% indicating a much improved color after treatment. The measured color is shown in Table 2.

Example 11

Treatment with UVC+Oxygen Injection

Treatment is conducted utilizing the same conditions as Example 9 except 1.0 standard L/min of oxygen is bubbled through an injection tube with a 25 mm diameter fine-bubble, fritted-glass disc injection tube produced by Ace Glass as part number 7196-20 in place of ozone. L* obtained for this polymer is 55.2 with a % change in L* of 29.8% indicating a much improved color after treatment. The measured color is shown in Table 2.

TABLE 2

| FEP | | |
|---|---|---|
| Examples | L* | % change of L* |
| Comparative Example 3 (no treatment) | 44.8 | |
| Example 10 | 58.4 | 39.0% |
| Example 11 | 55.2 | 29.8% |

What is claimed is:

1. Process for reducing thermally induced discoloration of fluoropolymer resin, said fluoropolymer resin produced by polymerizing fluoromonomer in an aqueous dispersion medium to form aqueous fluoropolymer dispersion and isolating said fluoropolymer from said aqueous medium to obtain said fluoropolymer resin, said process comprising:
    exposing the aqueous fluoropolymer dispersion to ultraviolet light in the presence of an oxygen source, wherein said aqueous fluoropolymer dispersion contains hydrocarbon surfactant which causes said thermally induced discoloration.

2. The process of claim 1 wherein said process reduces thermally induced discoloration by at least about 10% as measured by % change in L* on the CIELAB color scale.

3. The process of claim 1 wherein said fluoropolymer dispersion is polymerized in the presence of hydrocarbon surfactant.

4. The process of claim 1 wherein said oxygen source is selected from the group consisting of air, oxygen rich gas, ozone containing gas and hydrogen peroxide.

5. The process of claim 1 wherein said oxygen source comprises ozone containing gas.

6. The process of claim 1 wherein said oxygen source comprises hydrogen peroxide.

7. The process of claim 1 wherein the solids content of said dispersion during said exposing to ultraviolet light is about 2 weight % to about 30 weight %.

8. The process of claim 1 wherein said ultraviolet light has a wavelength in the UVC band.

9. The process of claim 1 wherein said exposing the aqueous fluoropolymer dispersion to ultraviolet light in the presence of an oxygen source is carried out at a temperature of about 5° C. to about 70° C.

10. The process of claim 1 wherein the fluoropolymer resin has an initial thermally induced discoloration value (L*i) at least 4 L units on the CIELAB color scale below the L* value of equivalent fluoropolymer resin of commercial quality manufactured using ammonium perfluorooctanoate fluorosurfactant.

11. The process of claim 1 wherein said hydrocarbon surfactant is selected from anionic surfactants represented by the formula R-L-M wherein R is preferably a straight chain alkyl group containing from 6 to 17 carbon atoms, L is selected from the group consisting of —$ArSO_3^-$, —$SO_3^-$, —$SO_4^-$, —$PO_3^-$, —$PO_4^-$ and —$COO^-$, wherein —$ArSO_3^-$ represents aryl sulfonate, and M is a univalent cation selected from $H^+$, $Na^+$, $K^+$ and $NH_4^+$.

* * * * *